(12) United States Patent
Watarai et al.

(10) Patent No.: US 8,025,598 B2
(45) Date of Patent: Sep. 27, 2011

(54) LOW PROFILE REAR DERAILLEUR WITH A CHAIN RECEIVING SPACE

(75) Inventors: Etsuyoshi Watarai, Izumi (JP); Shinya Oseto, Sakai (JP); Souta Yamaguchi, Sakai (JP)

(73) Assignee: Shimano, Inc., Sakai-ku, Sakai (JP)

( * ) Notice: Subject to any disclaimer, the term of this patent is extended or adjusted under 35 U.S.C. 154(b) by 225 days.

(21) Appl. No.: 11/552,291

(22) Filed: Oct. 24, 2006

(65) Prior Publication Data
US 2008/0096706 A1    Apr. 24, 2008

(51) Int. Cl.
*F16F 59/00* (2006.01)
(52) U.S. Cl. .................. 474/82; 474/78; 474/83
(58) Field of Classification Search ............ 474/80, 474/82, 83, 78, 81, 84
See application file for complete search history.

(56) References Cited

U.S. PATENT DOCUMENTS

| 534,680 A | 2/1895 | Bolte |
|---|---|---|
| 2,507,416 A | 5/1950 | Needham |
| 3,364,762 A | 1/1968 | Maeda |
| 3,535,950 A | 10/1970 | Shimano et al. |
| 3,677,103 A | 7/1972 | Huret et al. |
| 3,702,080 A | 11/1972 | Huret et al. |
| 3,803,933 A | 4/1974 | Huret et al. |
| 3,979,962 A | 9/1976 | Kebsch |
| 4,061,048 A | 12/1977 | Huret et al. |
| 4,226,131 A | 10/1980 | Yamasaki |
| 4,269,601 A | 5/1981 | Nagano |
| 4,277,077 A | 7/1981 | Ozaki |
| 4,286,953 A | 9/1981 | Shimano |
| 4,306,871 A | 12/1981 | Nagano |
| 4,406,643 A | 9/1983 | Shimano |
| 4,437,848 A | 3/1984 | Shimano |
| 4,443,208 A | 4/1984 | Kozakae |
| 4,470,823 A | 9/1984 | Shimano |
| 4,530,677 A | 7/1985 | Nagano |
| 4,552,546 A | 11/1985 | Ishikawa |
| RE32,059 E | 12/1985 | Nagano |
| 4,637,808 A | 1/1987 | Nakamura |
| 4,734,084 A | 3/1988 | Nagano |

(Continued)

FOREIGN PATENT DOCUMENTS

BE    425459 A    12/1937

(Continued)

OTHER PUBLICATIONS

European search report for EP 06004024.3, now published as EP 1826114 A1, the European application that corresponds to original claims 1-35 of related U.S. Appl. No. 11/307,941, dated Jun. 14, 2006.

(Continued)

*Primary Examiner* — Bradley King
*Assistant Examiner* — Thomas Irvin
(74) *Attorney, Agent, or Firm* — James A. Deland

(57) ABSTRACT

A bicycle rear derailleur comprises a base member; a movable member that supports a chain guide including a pulley that rotates around a pulley axis, wherein the pulley has a pulley plane; and a linking member coupled between the base member and the movable member so that the chain guide moves laterally relative to the base member between a first lateral position and a second lateral position. The base member has a chain receiving space therein.

15 Claims, 15 Drawing Sheets

U.S. PATENT DOCUMENTS

| | | | |
|---|---|---|---|
| 4,758,205 A | | 7/1988 | Durham |
| 4,789,379 A | | 12/1988 | Ozaki et al. |
| 4,838,837 A | | 6/1989 | Testa |
| 5,163,881 A | * | 11/1992 | Chattin ............................ 474/78 |
| 5,238,458 A | | 8/1993 | Ishibashi |
| 5,295,916 A | * | 3/1994 | Chattin ............................ 474/78 |
| 5,346,434 A | | 9/1994 | Hsu |
| 5,380,252 A | | 1/1995 | Iwasaki et al. |
| 5,380,253 A | | 1/1995 | Iwasaki |
| 5,445,567 A | * | 8/1995 | Chattin ............................ 474/78 |
| 5,456,637 A | | 10/1995 | Chang |
| 5,518,456 A | | 5/1996 | Kojima et al. |
| 5,597,366 A | | 1/1997 | Ozaki |
| 5,618,241 A | * | 4/1997 | Ose .................................. 474/80 |
| 5,624,334 A | | 4/1997 | Lumpkin |
| 5,688,200 A | * | 11/1997 | White ............................. 474/80 |
| 5,779,580 A | | 7/1998 | White et al. |
| 5,855,529 A | | 1/1999 | Sugimoto |
| 5,857,932 A | | 1/1999 | Sugimoto |
| 5,904,629 A | | 5/1999 | Oka |
| 6,015,360 A | * | 1/2000 | Chang ............................. 474/80 |
| 6,030,307 A | | 2/2000 | Oka |
| 6,135,905 A | | 10/2000 | Soon |
| 6,287,228 B1 | | 9/2001 | Ichida |
| 6,325,733 B1 | * | 12/2001 | Patterson et al. ............... 474/80 |
| 6,354,971 B1 | | 3/2002 | Howell et al. |
| 6,419,602 B1 | | 7/2002 | Soon |
| 6,692,389 B2 | * | 2/2004 | Yin .................................. 474/80 |
| 6,793,598 B1 | | 9/2004 | Savard |
| 7,014,584 B2 | | 3/2006 | Nanko et al. |
| 7,104,908 B2 | | 9/2006 | Nagano |
| 7,396,304 B2 | | 7/2008 | Shahana |
| 2004/0106482 A1 | | 6/2004 | Nagano |
| 2004/0116222 A1 | | 6/2004 | Shahana et al. |
| 2004/0254038 A1 | | 12/2004 | Chamberlain et al. |
| 2005/0176537 A1 | | 8/2005 | Matsumoto et al. |
| 2005/0187048 A1 | | 8/2005 | Fukuda |
| 2005/0192138 A1 | | 9/2005 | Sze et al. |
| 2005/0215368 A1 | | 9/2005 | Hoe |
| 2007/0021246 A1 | | 1/2007 | Shahana et al. |
| 2007/0202977 A1 | | 8/2007 | Watarai et al. |
| 2007/0202978 A1 | * | 8/2007 | Yamaguchi et al. ............ 474/82 |
| 2008/0064544 A1 | * | 3/2008 | Yamaguchi et al. ............ 474/80 |
| 2008/0064545 A1 | * | 3/2008 | Yamaguchi ..................... 474/82 |
| 2008/0081716 A1 | | 4/2008 | Watarai et al. |

FOREIGN PATENT DOCUMENTS

| | | |
|---|---|---|
| CH | 284668 | 7/1952 |
| CN | 1133806 A | 10/1996 |
| DE | 4022473 A1 | 1/1992 |
| DE | 9422229 U1 | 5/1999 |
| DE | 19915334 A1 | 10/2000 |
| EP | 32049 A2 | 7/1981 |
| EP | 0513394 A1 | 11/1992 |
| EP | 542077 A1 | 5/1993 |
| EP | 655386 A1 | 5/1995 |
| EP | 718185 A2 | 6/1996 |
| EP | 1010612 A1 | 6/2000 |
| EP | 1099620 A2 | 5/2001 |
| EP | 1475300 A2 | 11/2004 |
| EP | 1671881 A2 | 6/2006 |
| EP | 1764297 A1 | 3/2007 |
| FR | 760565 A | 2/1934 |
| FR | 799947 A | 6/1936 |
| FR | 869777 | 2/1942 |
| FR | 922775 A | 6/1947 |
| FR | 1000094 | 2/1952 |
| JP | 50-47153 A | 5/1975 |
| JP | 54-9853 A | 1/1979 |
| JP | 54-47247 A | 4/1979 |
| JP | 54-47248 A | 4/1979 |
| JP | 54-57736 A | 5/1979 |
| JP | 54-72831 A | 6/1979 |
| JP | 55-29695 A | 3/1980 |
| JP | 55-127272 A | 10/1980 |
| JP | 55-140678 A | 11/1980 |
| JP | 55-148676 A | 11/1980 |
| JP | 62-99291 A | 5/1987 |
| JP | 8-169387 A | 7/1996 |
| WO | 92-10395 A1 | 6/1992 |

OTHER PUBLICATIONS

European search report for EP 06022723.8, now published as EP 1829780 A1, the European application that corresponds to original claims 47-67 of related U.S. Appl. No. 11/307,941, dated Jul. 30, 2007.

European search report for EP 06026059.3, now published as EP 1826115 A2, the European application that is equivalent to U.S. Appl. No. 11/423,247, an application related to this application, dated Dec. 14, 2007.

European search report for EP 06026059.3, now published as EP 1826115 A2, the European application that is equivalent to U.S. Appl. No. 11/423,247, an application related to this application, dated Feb. 13, 2008.

European search report for EP 08161785.4, now published as EP 2000399 A1, the European application that corresponds to original claims 36-46 of related U.S. Appl. No. 11/307,941, dated Oct. 14, 2008.

Taiwanese office action and search report for TW 095137042, the Taiwanese application that corresponds to co-pending related U.S. Appl. No. 11/423,247, dated Feb. 16, 2009.

Taiwanese office action and search report for TW 095132098, the Taiwanese application that corresponds to co-pending related U.S. Appl. No. 11/307,941, dated Feb. 18, 2009.

European Search Report and office action for EP 07022964.6, the European application that corresponds to co-pending related U.S. Appl. No. 11/747,460, dated Jun. 2, 2009.

European Search Report and office action dated Jun. 17, 2009, for EP 09154602.8, a divisional of EP 06026059.3, now published as EP 1826115 A2. EP 1826115 A2 is the European application that corresponds to co-pending related U.S. Appl. No. 11/423,247.

EPO office action dated Jun. 28, 2010 for EP 07007210.3, the EP application that corresponds to this application.

Winkler, et al.; "Fahrradtechnik," pp. 1,2 and 269, published in 1989 by Bielefelder Verlagsanstalt KG in Germany.

Notice of Opposition filed Mar. 9, 2011 against EP 1826114 B1, the European patent that pertains to claims 1-46, 71-83 and 93 of co-pending related U.S. Appl. No. 11/307,941.

European search report for EP 07007210.3, the European application that corresponds to this application, dated Apr. 16, 2008.

European Search Report for EP 08003740.1 (now published as EP 1939085 A2), dated Aug. 14, 2009. EP 1939085 is the European application that corresponds to claims 1-45 of co-pending related U.S. Appl. No. 11/963,712.

* cited by examiner

LOW PROFILE REAR DERAILLEUR WITH A CHAIN RECEIVING SPACE

BACKGROUND OF THE INVENTION

The present invention is directed to bicycles and, more particularly, to a low profile rear derailleur used to switch a chain among a plurality of sprockets that rotate with the rear wheel.

A bicycle rear derailleur is used to selectively engage a chain with one of a plurality of sprockets that rotate with the rear wheel of the bicycle. A typical rear derailleur comprises a base member, a movable member supporting a chain guide, and a linking mechanism coupled between the base member and the movable member so that the chain guide moves laterally relative to the base member. The base member usually is mounted to the rear end of the bicycle frame by a mounting bolt that screws into a threaded opening formed in the frame. Because of the nature of the lateral movement of the chain guide required to switch the chain among the sprockets, the linking mechanism, the movable member and the chain guide all protrude laterally outward by a significant distance, especially when the chain is engaged with the laterally outermost rear sprocket. As a result, the chain guide is susceptible to striking or becoming entangled with nearby objects, especially when riding off-road in mountainous terrain. The effect becomes more severe as the number of sprockets increase.

SUMMARY OF THE INVENTION

The present invention is directed to various features of a bicycle rear derailleur. In one embodiment, a bicycle rear derailleur comprises a base member; a movable member that supports a chain guide including a pulley that rotates around a pulley axis, wherein the pulley has a pulley plane; and a linking member coupled between the base member and the movable member so that the chain guide moves laterally relative to the base member between a first lateral position and a second lateral position. The base member has a chain receiving space therein. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
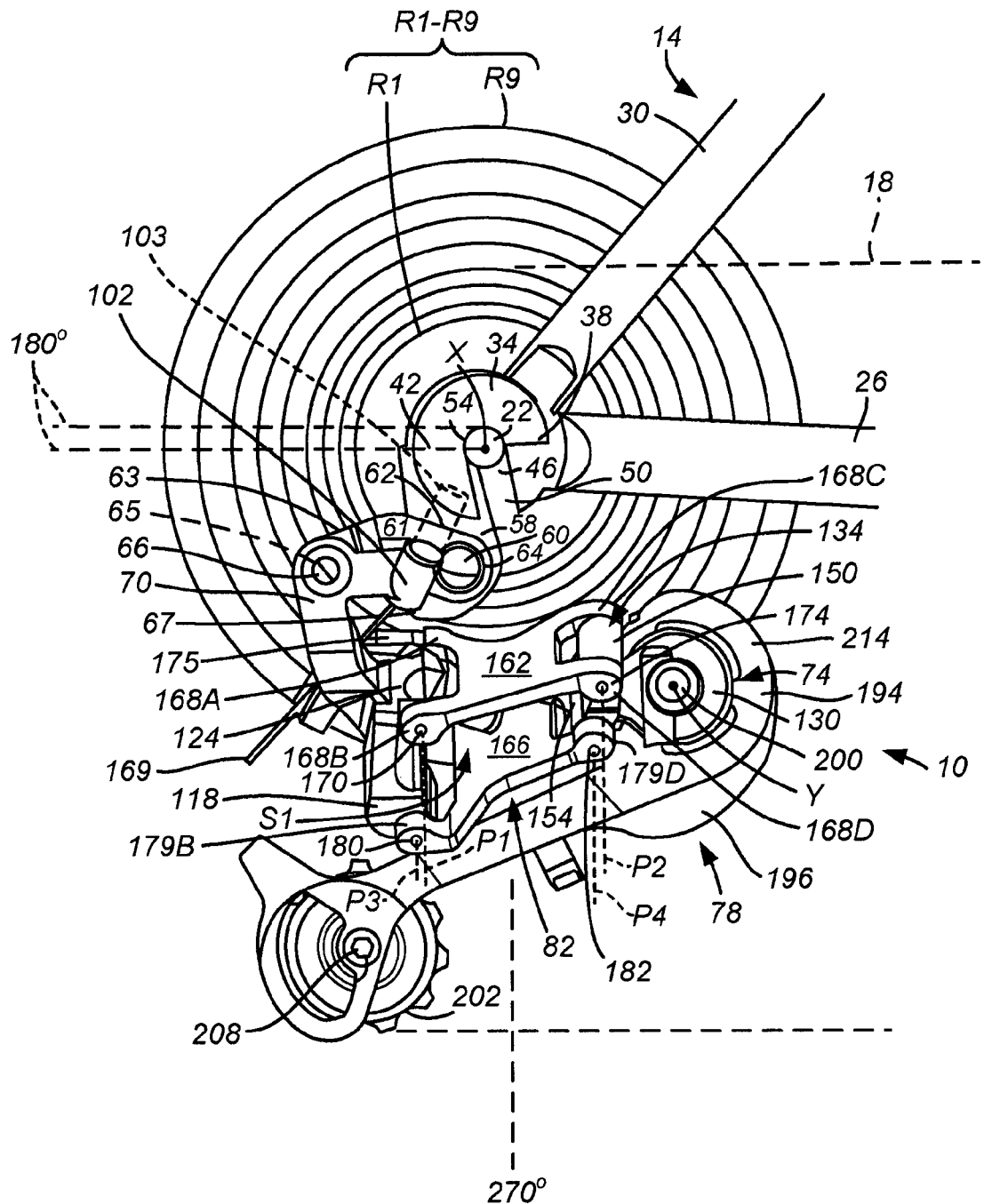
FIG. 1 is a laterally outer view of a particular embodiment of a rear derailleur in a middle speed position.
Figure 2:
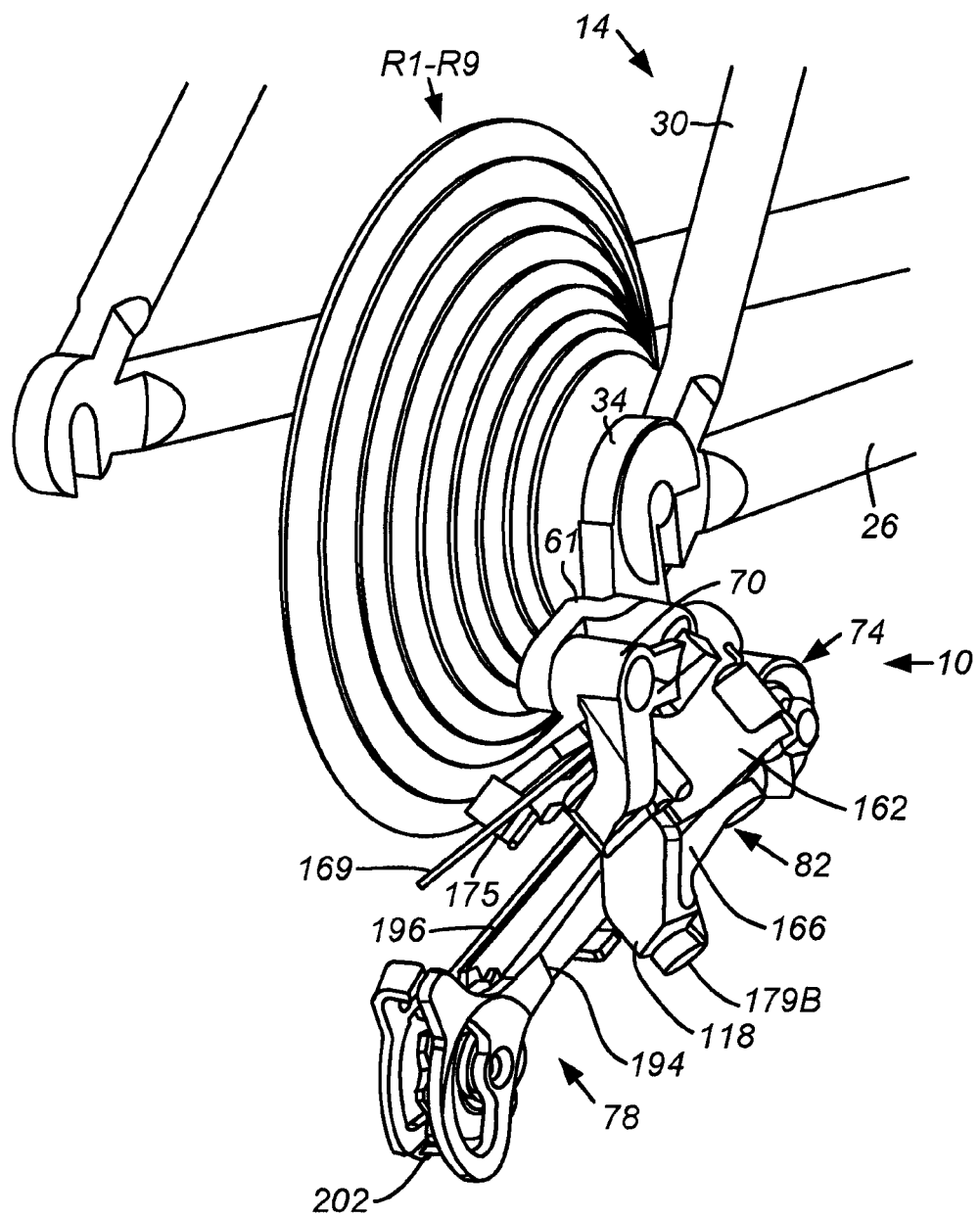
FIG. 2 is a rear oblique view of the derailleur in the middle speed position.
Figure 3:
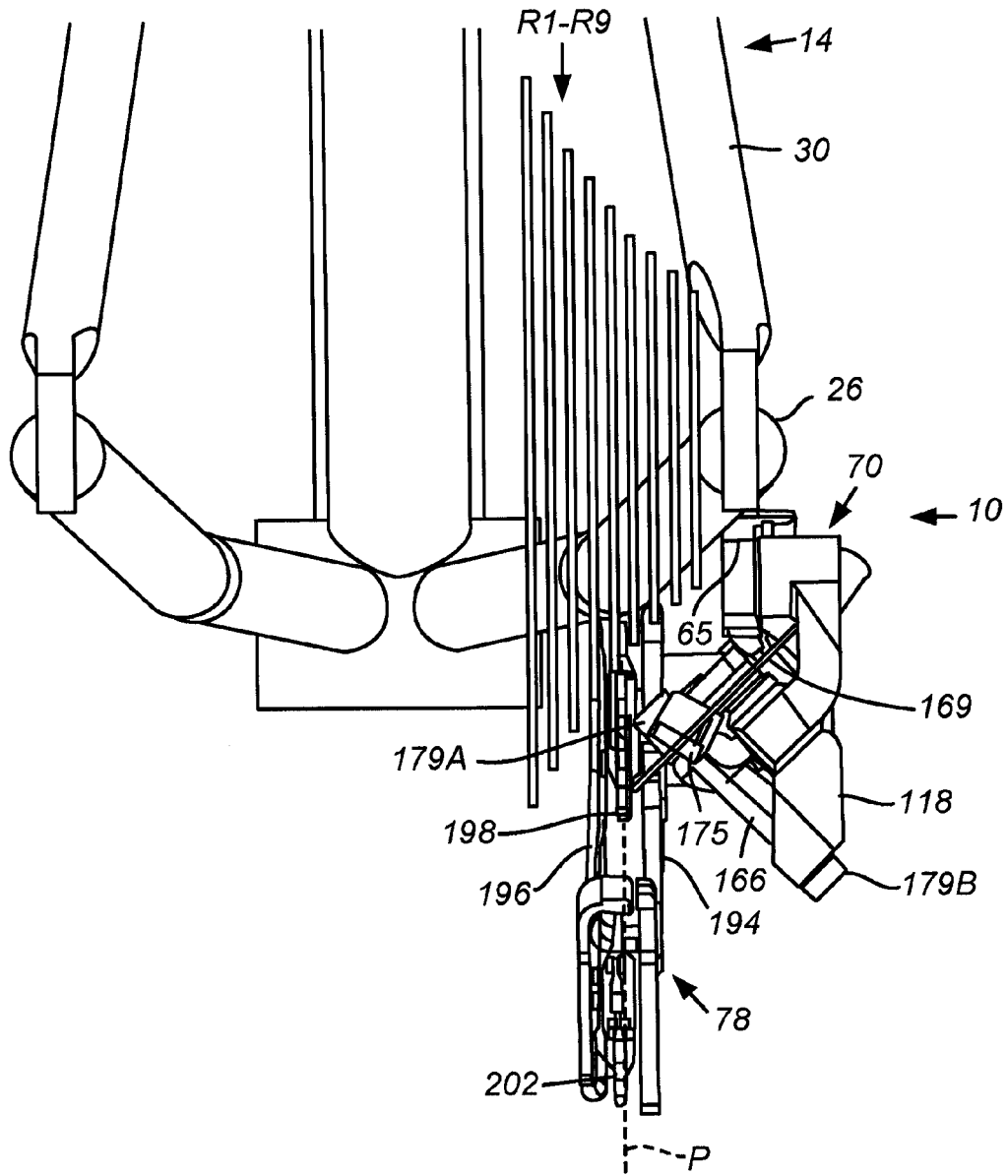
FIG. 3 is a rear view of the derailleur in the middle speed position.

FIG. 1 is a laterally outer view of a particular embodiment of a rear derailleur 10 in a middle speed position, FIG. 2 is a rear oblique view of derailleur 10, and FIG. 3 is a rear view of derailleur 10. As shown in FIG. 1, rear derailleur 10 is mounted to the rear portion of a bicycle frame 14 for guiding a chain 18 among a plurality of rear sprockets R1-R9 that rotate coaxially around a rear wheel axle 22 supported to frame 14, wherein axle 22 defines a rotational axis X.

Bicycle frame 14 is part of an overall bicycle frame that includes a chain stay 26, a seat stay 30 and a frame end 34 (commonly referred to as a dropout) that joins chain stay 26 and seat stay 26 together, typically by welding chain stay 26 and seat stay 30 to frame end 34. Conceptually, each of these frame structures is well known. In this embodiment, frame end 34 comprises a forward portion 38 and a rearward portion 42, wherein forward portion 38 extends from chain stay 26 and seat stay 30 to a horizontal position aligned with rotational axis X, and rearward portion 42 extends from a horizontal position aligned with rotational axis X rearwardly and substantially vertically downwardly. A junction between forward portion 38 and rearward portion 42 forms an axle receiving slot 46 dimensioned to receive rear axle 22 therein. In this embodiment, axle receiving slot 46 is oriented substantially vertically with a slight incline and defines an open end 50 and a closed end 54, wherein open end 50 is disposed below closed end 54. Rearward portion 42 forms a mounting boss 58 with an opening (not shown) dimensioned to receive a mounting bolt 60 therein.

Derailleur 10 is mounted to an extension member 61 having a first end portion 62 and a second end portion 63, wherein first end portion 62 includes a mounting opening 64 dimensioned for receiving mounting bolt 60 therein. Second end portion 63 includes a derailleur attachment structure in the form of a derailleur mounting opening 65 (FIG. 3) dimensioned for receiving a mounting bolt 66 therethrough. Extension member 61 is dimensioned such that, when extension member 61 is attached to frame end 34, derailleur mounting opening 65 is located from approximately 180° to approximately 240° relative to axle receiving opening 46, from approximately 180° to approximately 240° relative to rotational axis X, or, to facilitate measurement independently of axle 22, from approximately 180° to approximately 240° relative to closed end 54 of axle receiving opening 46. Rearward portion 42 extends further downwardly from mounting opening 64 to form a position setting abutment 67 that is used in a known manner to adjust the rotational position of derailleur 10 relative to frame 14.

Figure 4:
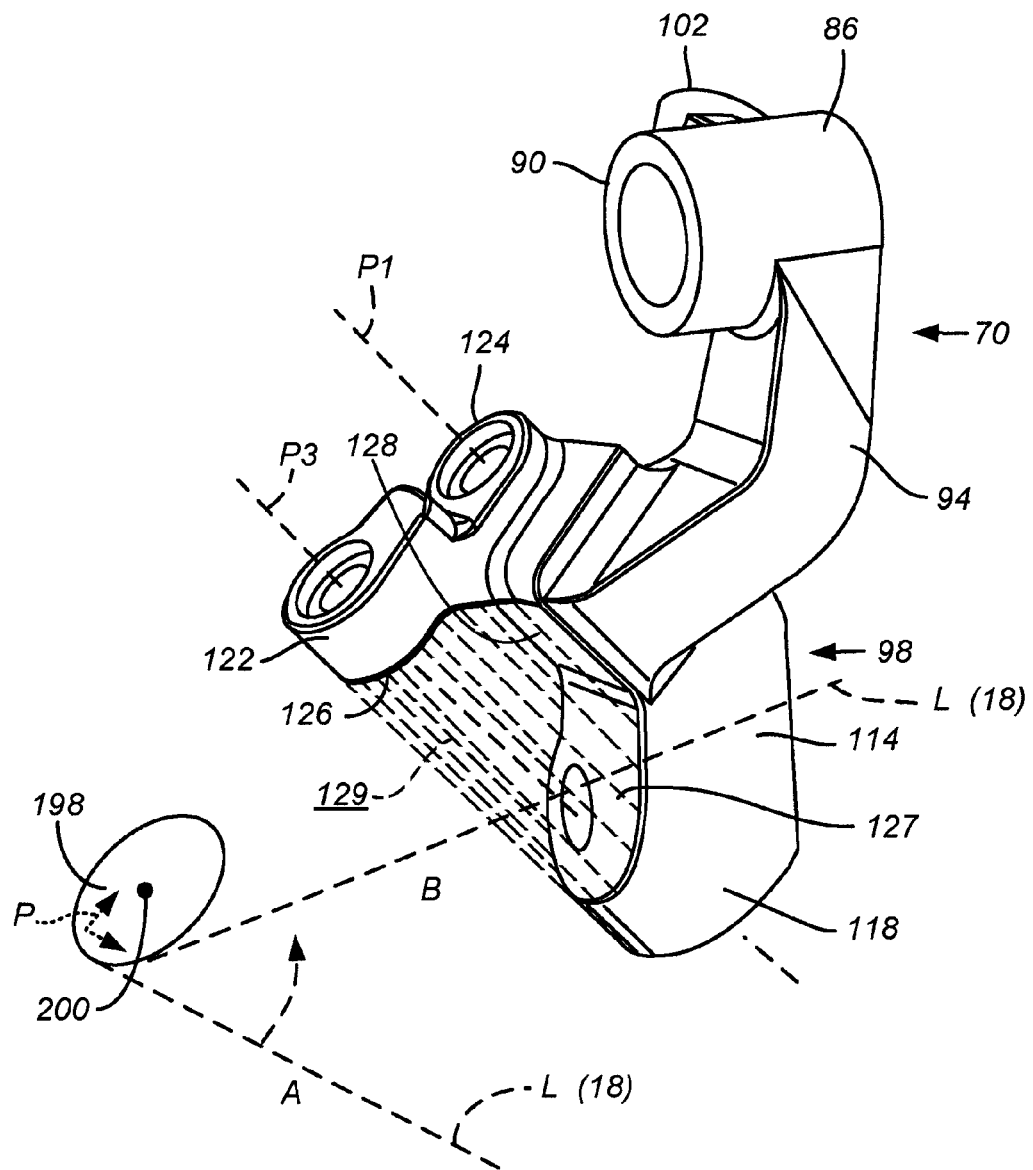
FIG. 4 is an inner rear oblique view of the base member.
Figure 5:
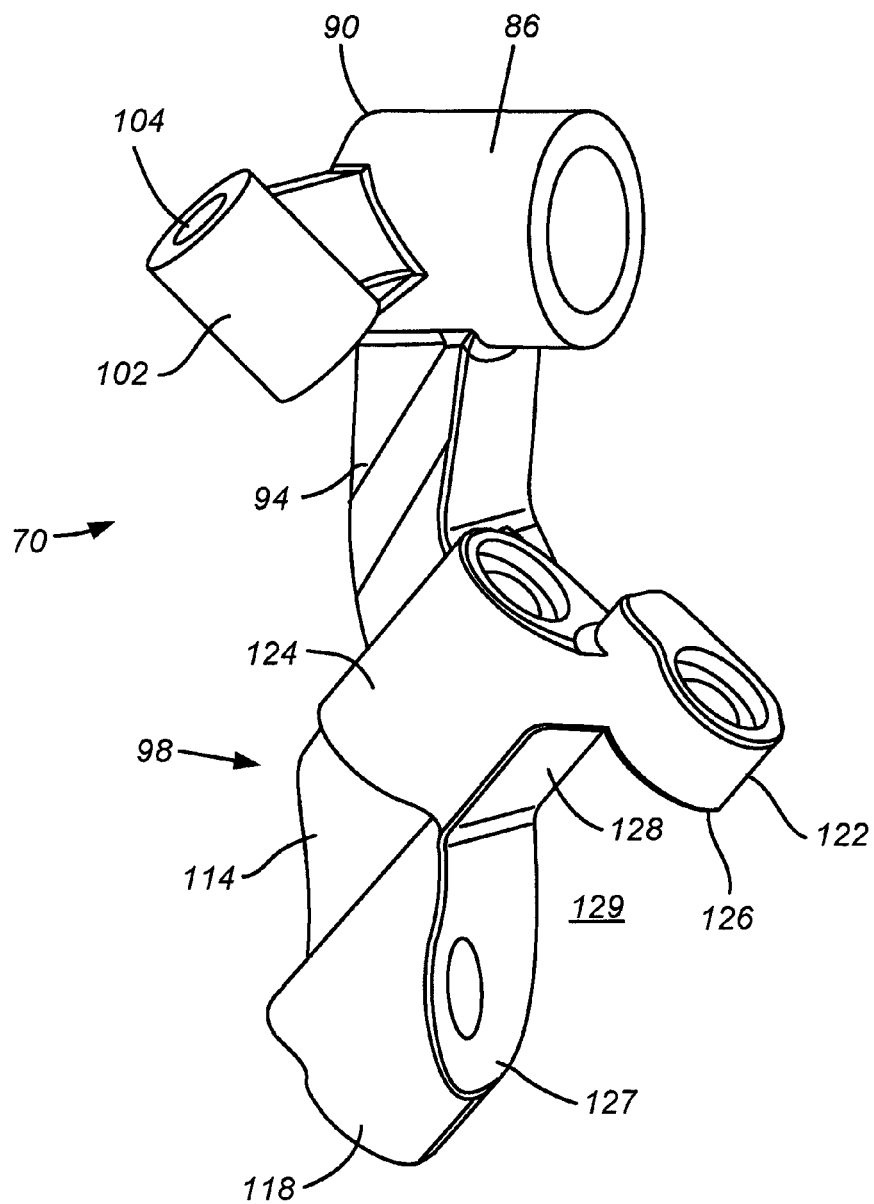
FIG. 5 is an outer rear oblique view of the base member.

Derailleur 10 comprises a base member 70, a movable member 74 that supports a chain guide 78, and a linking mechanism 82 coupled between base member 70 and movable member 74 so that chain guide 78 moves laterally upwardly-outwardly and laterally downwardly-inwardly relative to base member 70. As best seen in FIGS. 4 and 5, base member 70 comprises a cylindrical mounting boss 86 with an annular mounting surface 90 that faces laterally inwardly toward second end portion 63 of extension member 61, a transition portion 94 that extends downwardly from mounting boss 86, and a link coupling portion 98 disposed at a lower end portion of extension portion 94.

An outer casing coupler 102 in the form of a hollow cylinder is disposed at mounting boss 86, wherein outer casing coupler 102 includes an outer casing receiving bore 104 dimensioned to couple to and terminate an outer casing 103 of a Bowden cable in a known manner. Outer casing coupler 102 is positioned to be located rearward from rotational axis X and laterally outwardly from mounting boss 86. If desired, a cable adjusting bolt (not shown), the concept and structure of which are well known, may be mounted in outer casing receiving bore 104 so as to be disposed between outer casing coupler 102 and the outer casing 103 of the Bowden cable.

Link coupling portion 98 includes a support wall 114, a laterally outer link mounting projection 118, a laterally inner link mounting projection 122, and a link mounting boss 124. In this embodiment, a laterally outwardly facing surface 126 of laterally inner link mounting projection 122, a laterally inwardly facing surface 127 of laterally outer link mounting projection 118, and a rearwardly and downwardly facing surface 128 of support wall 114 form a chain receiving space 129. In general, chain receiving space 129 may be determined by the greatest space formed by the intersection of (1) the projection of a laterally inwardly or outwardly facing surface of link coupling portion 98 along pivot axis P3 with (2) projections of downwardly or rearwardly facing surfaces of link coupling portion 98 in the respective downward or rearward directions. Chain receiving space 129 formed by such intersections is shown by dashed lines in FIG. 4.

As shown in FIG. 1, movable member 74 comprises a main body 130 and a link mounting frame 134. In this embodiment, main body 130 comprises a generally cylindrical member that houses a torsion coil spring (not shown) that biases chain guide 78 in a clockwise direction. Link mounting frame 134 comprises an upper link mounting boss 150 and a lower link mounting boss 154, both of which are formed as one piece with main body 130.

Figure 6:
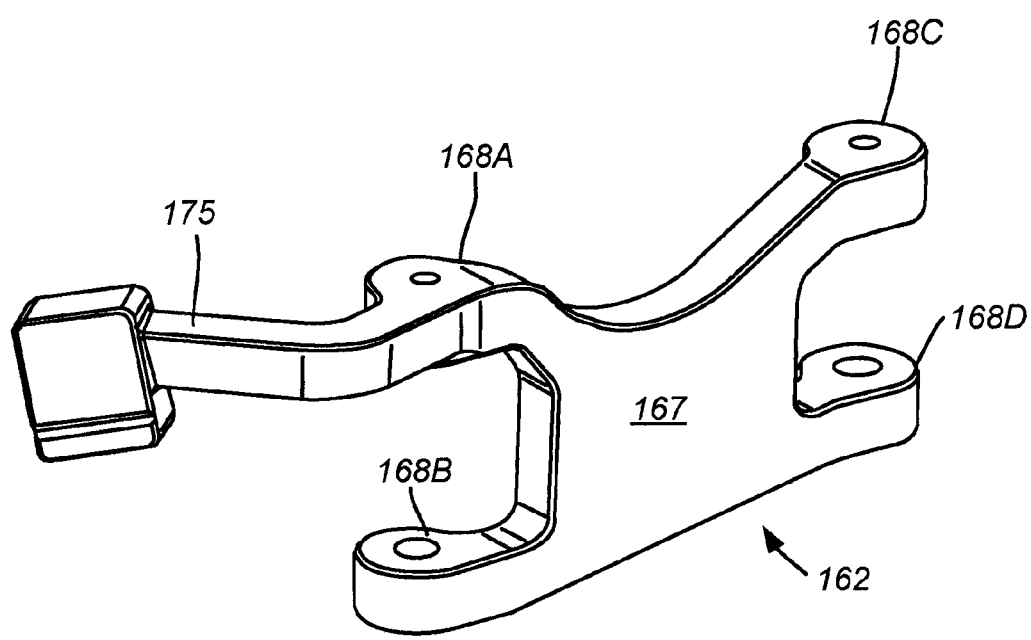
FIG. 6 is a detailed view of an outer linking member.

Linking mechanism 82 comprises linking members in the form of a laterally outer upper link 162 and a laterally inner lower link 166. As shown in FIGS. 1 and 6, upper link 162 comprises a main body 167, four coupling projections 168A-168D, and an actuating arm 175 extending from coupling projection 168A. A conventional cable attachment structure (not shown) in the form of a bolt and a clamping washer is provided at the outer end of actuating arm 175 to attach an inner cable of a Bowden cable. Coupling projection 168A is disposed at the laterally inner side of link mounting boss 124 of base member 70, and coupling projection 168B is disposed at the laterally outer side of link mounting boss 124, wherein coupling projections 168A and 168B are pivotably coupled to link mounting boss 124 by a pivot shaft 170 that is coaxial with a pivot axis P1. In this embodiment, actuating arm 175 is disposed directly above laterally inner link mounting projection 122 of base member 70 so that laterally inner link mounting projection 122 may function as a limit stop for actuating arm 175. Coupling projection 168C is disposed at the laterally inner side of upper link mounting boss 150 of movable member 74, and coupling projection 168D is disposed at the laterally outer side of upper link mounting boss 150, wherein coupling projections 168C and 168D are pivotably coupled to upper link mounting boss 150 through a pivot shaft 174 that is coaxial with a pivot axis P2.

Figure 7:
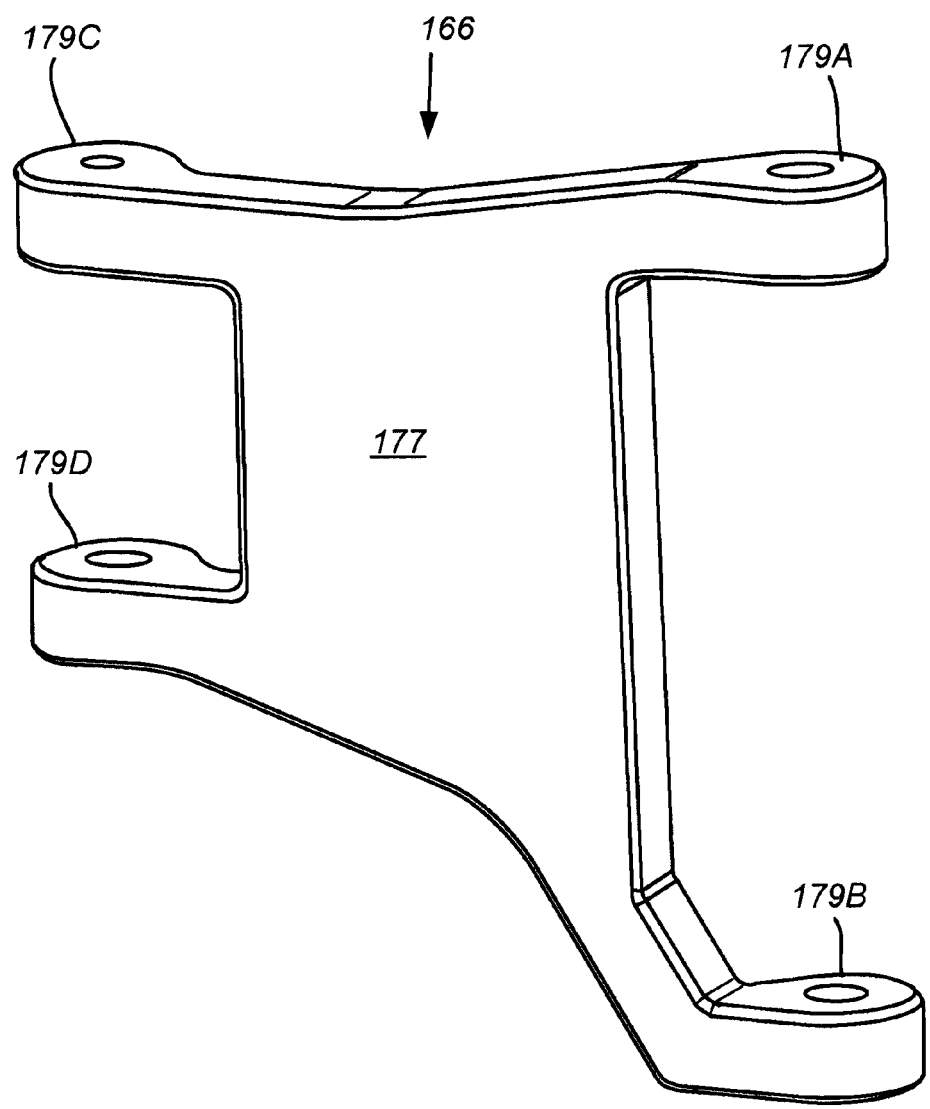
FIG. 7 is a detailed view of an inner linking member.
Figure 8:
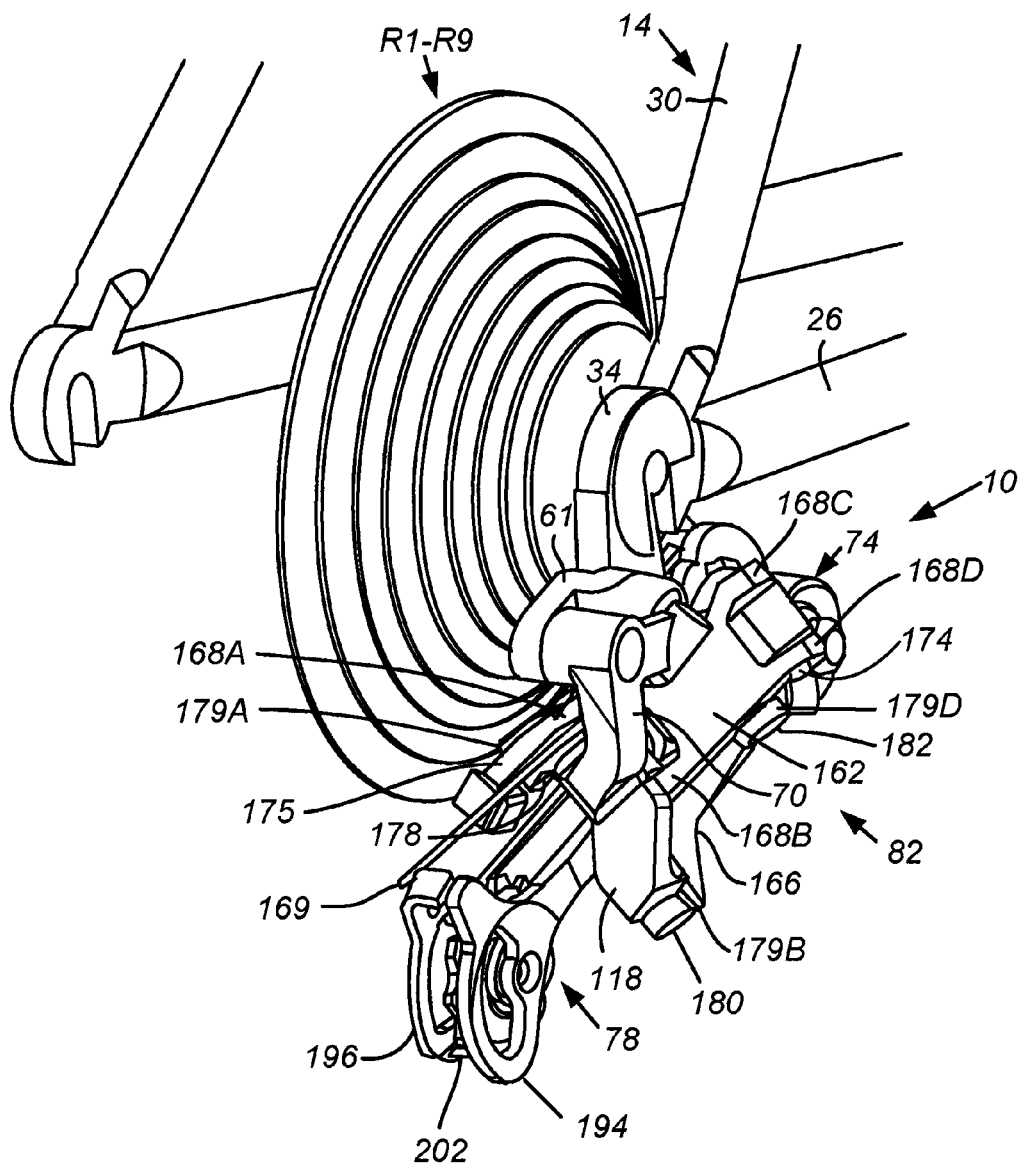
FIG. 8 is a rear oblique view of the derailleur in the high speed position.

As shown in FIGS. 1 and 7, lower link 166 comprises a main body 177 and four coupling projections 179A-179D. Coupling projection 179A is disposed at the laterally inner side of laterally inner link mounting projection 122 of base member 70 and is pivotably coupled thereto by a pivot shaft 178 (FIG. 8) that is coaxial with a pivot axis P3. Coupling projection 179B is disposed at the laterally outer side of laterally outer link mounting projection 118 of base member 70 and is pivotably coupled thereto by a pivot shaft 180 that also is coaxial with pivot axis P3. As shown in FIG. 4, pivot axis P3 intersects chain receiving space 129. Coupling projection 179C is disposed at the laterally inner side of lower link mounting boss 154 of movable member 74, and coupling projection 179D is disposed at the laterally outer side of lower link mounting boss 154, wherein coupling projections 179C and 179D are pivotably coupled to lower link mounting boss 154 through a pivot shaft 182 that is coaxial with a pivot axis P4. A coiled return spring (not shown) is connected between base member 70 and movable member 74 to bias movable member 74 laterally outwardly in a known manner.

In this embodiment, chain guide 78 comprises an outer chain guide frame 194, an inner chain guide frame 196, a first or upper guide pulley 198 (FIG. 3), and a second or lower tension pulley 202. Guide pulley 198, the upper portion of outer chain guide frame 194, and the upper portion of inner chain guide frame 196 are rotatably mounted to main body 130 of movable member 74 through a pivot shaft 200 so as to rotate around a rotational axis Y. Tension pulley 202 is rotatably mounted between outer chain guide frame 194 and inner chain guide frame 196 through a pivot shaft 208. An arcuate chain pushing member 214 is disposed at the upper portion of outer chain guide frame 194 between main body 130 of movable member 74 and guide pulley 198 to push chain 18 when switching chain 18 from a smaller diameter sprocket to a larger diameter sprocket and to prevent chain 18 from derailing from guide pulley 198.

As shown in FIG. 3, guide pulley 198 has a pulley plane P that bisects guide pulley 198. In this embodiment, each tooth on guide pulley 198 is symmetrical and centered on the pulley when viewed perpendicular to pivot shaft 200 so that pulley plane P is located in the center of guide pulley 198, and all of the pulley teeth lie in pulley plane P. In order to provide a decreased laterally outward profile for derailleur 10, the components are structured so that pulley plane P intersects at least one of upper link 162 or lower link 166 when chain guide 78 is disposed in a position somewhere between a laterally outermost rest position and a laterally innermost position (such as the laterally outermost position shown in FIG. 9).

As used throughout herein, the word "intersect" has the ordinary meaning of having one or more points in common. Thus, the term also includes, for example, a tangent relationship. The laterally outermost position may be the laterally outermost position when derailleur 10 is removed from the bicycle. In this case, the laterally outermost position may be determined by the position of chain guide 78 with the derailleur at rest and subjected only to the biasing force of the return spring between base member 70 and movable member 74, and the laterally innermost position is determined by the position of chain guide 78 when chain guide 78 is manually pulled to its laterally innermost position. Alternatively, the laterally outermost position may be determined by the position of chain guide 78 when it is set to be aligned with the smallest diameter rear sprocket R1, and the laterally innermost position may be determined by the position of chain guide 78 when it is set to be aligned with the largest diameter rear sprocket R9. The word "between" is used in an inclusive sense.

Figure 9:
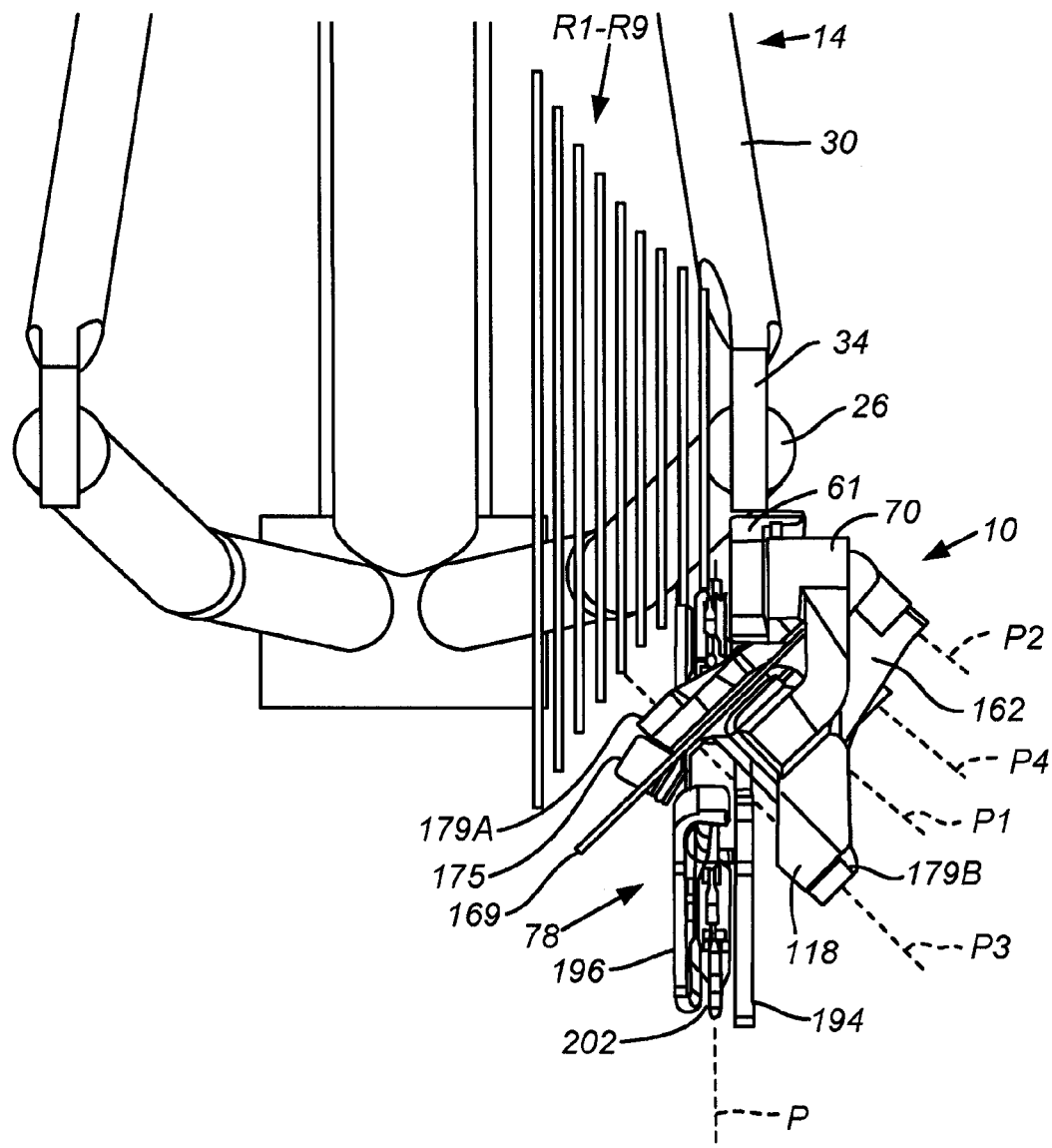
FIG. 9 is a rear view of the derailleur in the high speed position.

Furthermore, in this embodiment, pulley plane P intersects at least one of pivot axis P1 or pivot axis P3 when measured across all components at the coupling when chain guide 78 is disposed in a position somewhere between a laterally outermost rest position and a laterally innermost position (such as the laterally outermost position shown in FIG. 9). For example, pivot shaft 170 defines pivot axis P1 and couples upper link 162 to base member 70. The laterally inner tip of pivot shaft 170 is exposed at the laterally inner side of coupling projection 168A of upper link 162, and the laterally outer tip of pivot shaft 170 exposed at the laterally outer side of coupling projection 168B of upper link 162. The length of pivot axis P1 measured across all components at the coupling therefore extends from the laterally inner tip of pivot shaft 170 at pivot axis P1 to the laterally outer tip of pivot shaft 170. Similarly, pivot shafts 178 and 180 define pivot axis P3 and couple lower link 166 to base member 70. The laterally inner tip of pivot shaft 178 is exposed at the laterally inner side of coupling projection 179A of lower link 166, and the laterally outer tip of pivot shaft 180 is exposed at the laterally outer side of coupling projection 179B of lower link 166. The length of pivot axis P1 measured across all components at the coupling therefore extends from the laterally inner tip of pivot shaft 178 at pivot axis P3 to the laterally outer tip of pivot shaft 180 at pivot axis P3.

In this embodiment, pulley plane P intersects both upper link 162 and lower link 166 as well as pivot axes P1 and P3 when chain guide 78 is disposed in a position somewhere between the laterally outermost position and the laterally innermost position, such as the laterally outermost position shown in FIG. 9. However, it is not necessary to intersect all recited components at all lateral positions of chain guide 78. For example, while at least one of pivot axes P1-P4 is disposed on a laterally inner side of pulley plane P, and at least one of pivot axes P1-P4 is disposed on a laterally outer side of pulley plane P, in this embodiment second pivot axis P2 and fourth pivot axis P4 as measured according to the definition above are disposed entirely on the laterally outer side of pulley plane P in the position shown in FIG. 9. In this embodiment, pulley plane P intersects a space S1 (FIG. 1) between any facing surfaces of upper link 162 and lower link 166. Pulley plane P also intersects base member 70 when chain guide 78 is disposed in a position somewhere between the laterally outermost position and the laterally innermost position, such as the laterally outermost position shown in FIG. 9.

To further facilitate the ability of chain guide 78 to move laterally outwardly-upwardly relative to base member 70 and pivot clockwise relative to movable member 74 while maintaining a low profile, base member 70 is shaped to form chain receiving space 129 as discussed above. As shown schematically in FIG. 4, chain receiving space 129 is dimensioned and positioned such that a straight phantom line L tangent to and extending from guide pulley 198 or tension pulley 202 (e.g., extending rearwardly from a lower portion of guide pulley 198 toward an upper portion of tension pulley 202) and lying within pulley plane P can move from outside chain receiving space 129 (position A) to inside chain receiving space 129 (position B) without intersecting base member 70. Phantom line L typically corresponds to chain 18 as it travels between guide pulley 198 and tension pulley 202. The tangential relation between phantom line L and guide pulley 198 or tension pulley 202 may be determined by common reasoning and may include tangent to a pitch circle of guide pulley 198 or tension pulley 202, tangent to a circle that simply circumferentially intersects the teeth of guide pulley 198 or tension pulley 202, tangent to a circle that intersects the tips of a majority or all of the teeth of guide pulley 198 or tension pulley 202, and so on. As a result, chain receiving space 129 can receive at least a part of chain 18 when chain guide 78 is disposed in a position somewhere between a laterally outermost rest position and a laterally innermost position (such as the laterally outermost position shown in FIG. 9). In other words, chain receiving space 129 is formed for avoiding interference, obstruction, etc. as a result of the proximity of chain 18 to base member 70. Such undesirable effects could include contact between chain 18 and base member 70, contact by base member 70 with mud, vegetation or other undesirable elements carried or drawn by chain 18, and so on, when chain guide 78 is disposed in a position somewhere between a laterally outermost rest position and a laterally innermost position (such as the laterally outermost position shown in FIG. 9).

Figure 10:
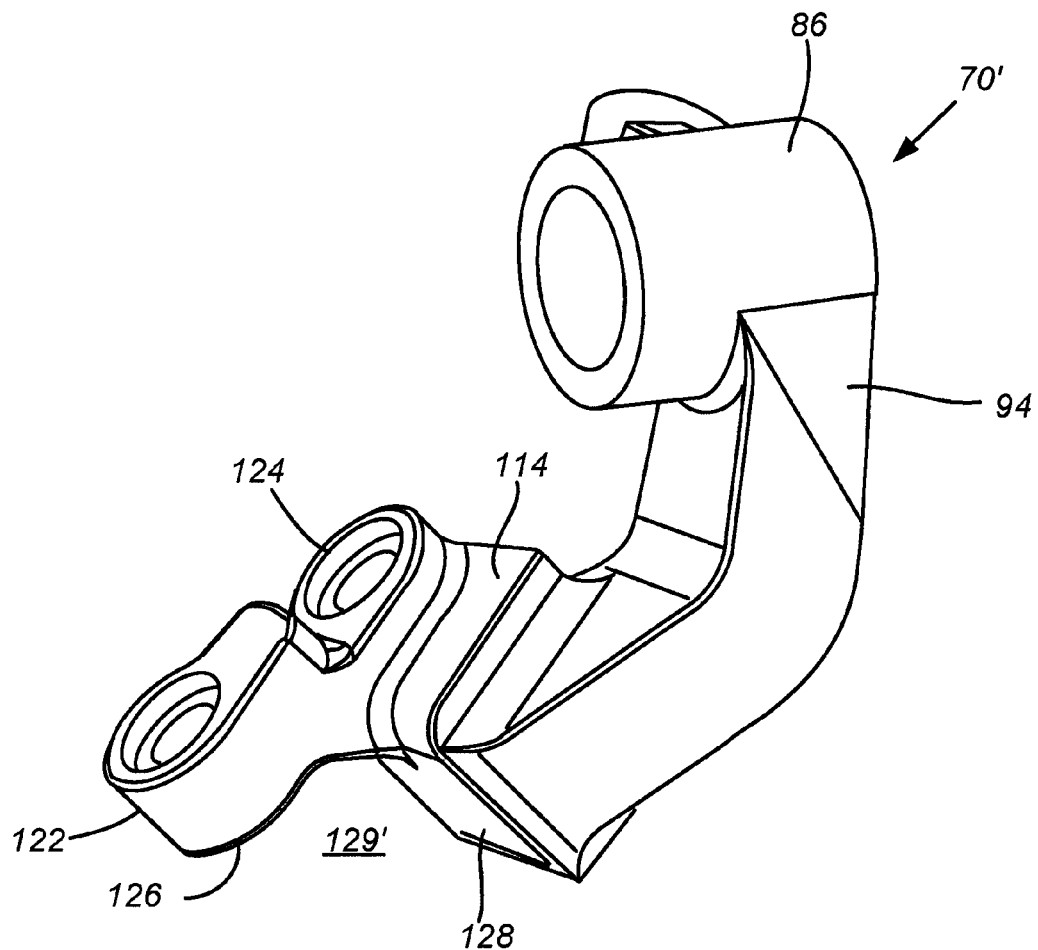
FIG. 10 is an inner rear oblique view of another embodiment of a base member.
Figure 11:
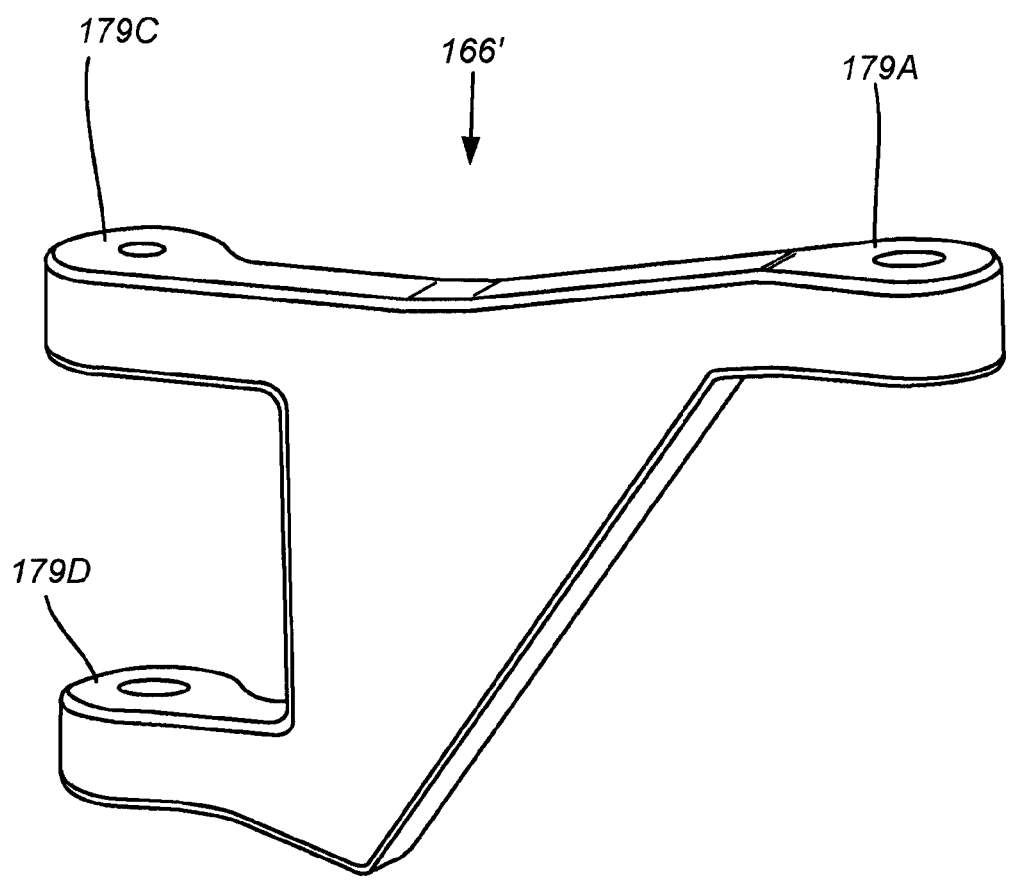
FIG. 11 is a detailed view of an embodiment of an inner linking member used with the base member shown in FIG. 10.

FIG. 10 is an inner rear oblique view of another embodiment of a base member 70', and FIG. 11 is a detailed view of an embodiment of a lower link 166' that may be used with base member 70'. In this embodiment, laterally outer link coupling projection 118 is omitted from base member 70 in the first embodiment, and coupling projection 179B is omitted from lower link 166 in the first embodiment. As a result, lower link 166' is pivotably mounted to base member 70' only by the coupling between coupling projection 179A and laterally inner link coupling projection 122 (through a pivot shaft 178 as in the first embodiment). A chain receiving space 129' that accommodates a phantom line L as described above is formed using the rule discussed above by the laterally outwardly facing surface 126 of laterally inner link mounting projection 122 and the rearwardly and downwardly facing surface 128 of support wall 114. As a result, chain receiving space 129' can receive at least a part of chain 18 when chain guide 78 is disposed in a position somewhere between a laterally outermost rest position and a laterally innermost position (such as the laterally outermost position shown in FIG. 9).

Figure 12:
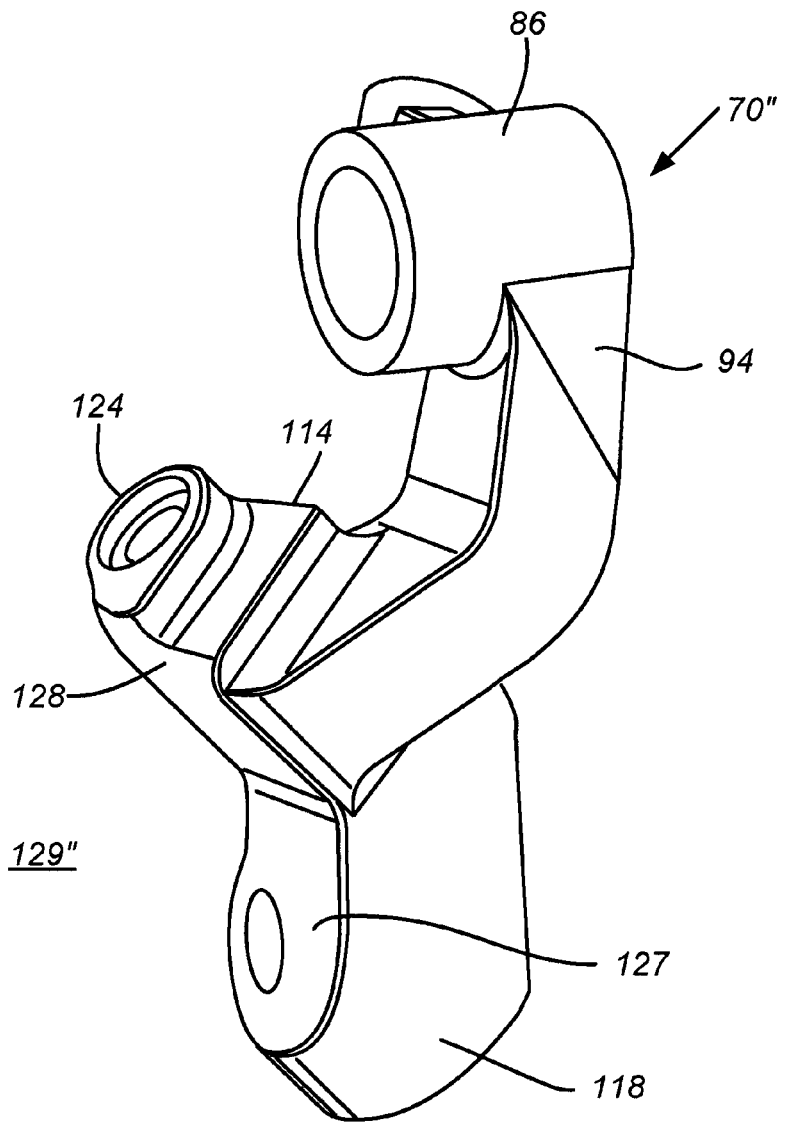
FIG. 12 is an inner rear oblique view of another embodiment of a base member.
Figure 13:
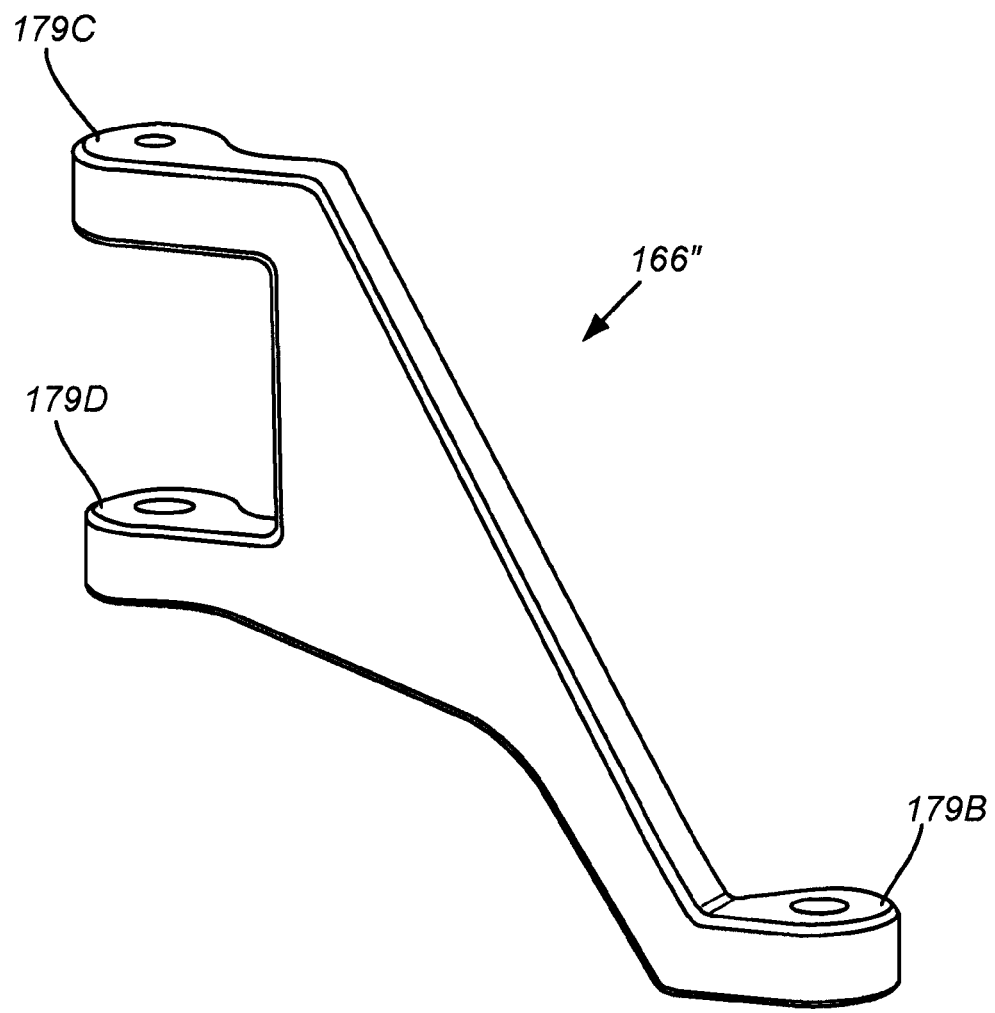
FIG. 13 is a detailed view of an embodiment of an inner linking member used with the base member shown in FIG. 12.

FIG. 12 is an inner rear oblique view of another embodiment of a base member 70", and FIG. 13 is a detailed view of an embodiment of a lower link 166" that may be used with base member 70". In this embodiment, laterally inner link coupling projection 122 is omitted from base member 70 in the first embodiment, and coupling projection 179A is omitted from lower link 166 in the first embodiment. As a result, lower link 166" is pivotably mounted to base member 70" only by the coupling between coupling projection 179B and laterally outer link coupling projection 118 (through a pivot shaft 180 as in the first embodiment). A chain receiving space 129" that accommodates a phantom line L as described above is formed using the rule discussed above by the laterally inwardly facing surface 127 of laterally outer link mounting projection 118 and the rearwardly and downwardly facing surface 128 of support wall 114. As a result, chain receiving space 129" can receive at least a part of chain 18 when chain guide 78 is disposed in a position somewhere between a laterally outermost rest position and a laterally innermost position (such as the laterally outermost position shown in FIG. 9).

Figure 14:
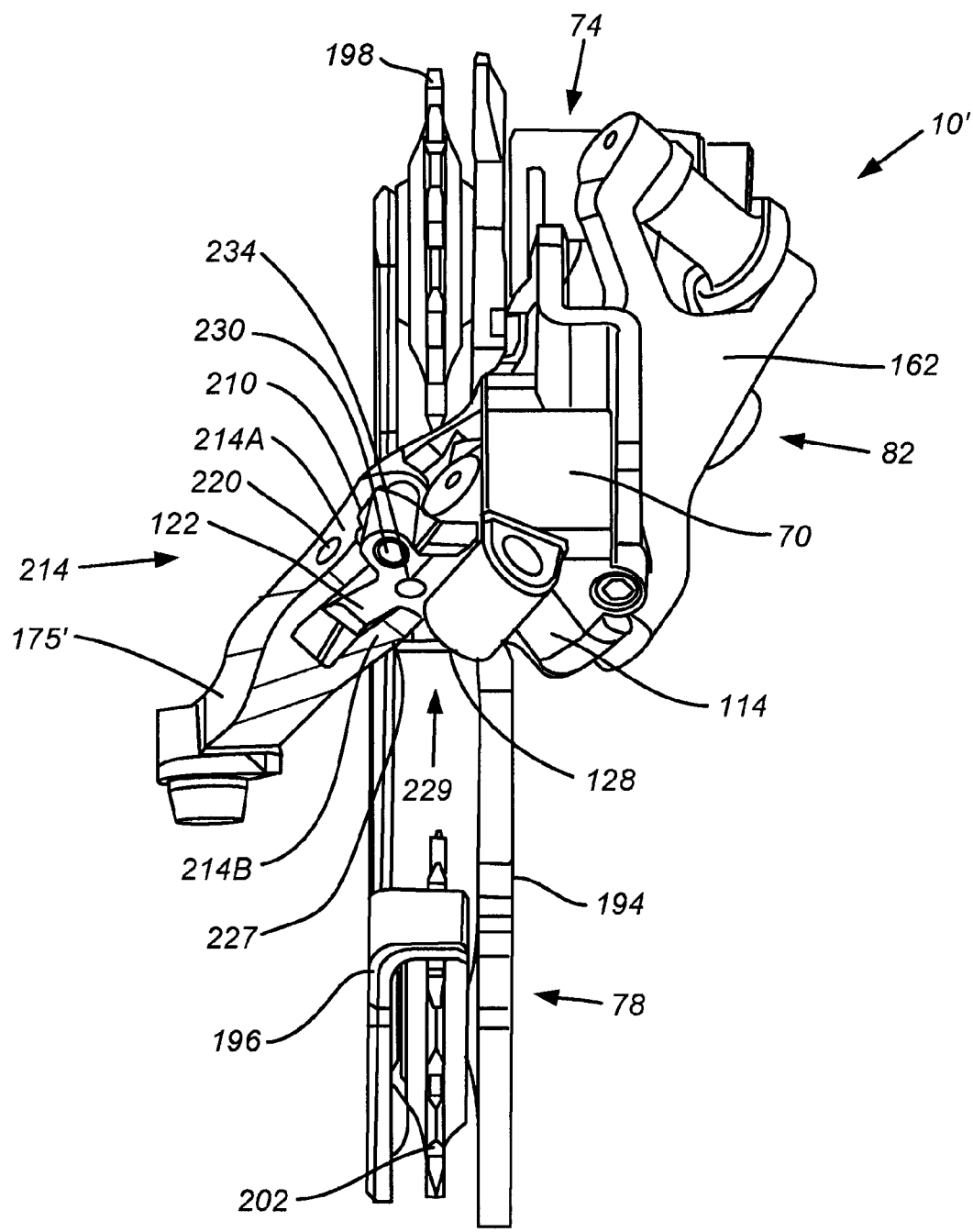
FIG. 14 is a rear view of another embodiment of a derailleur.
Figure 15:
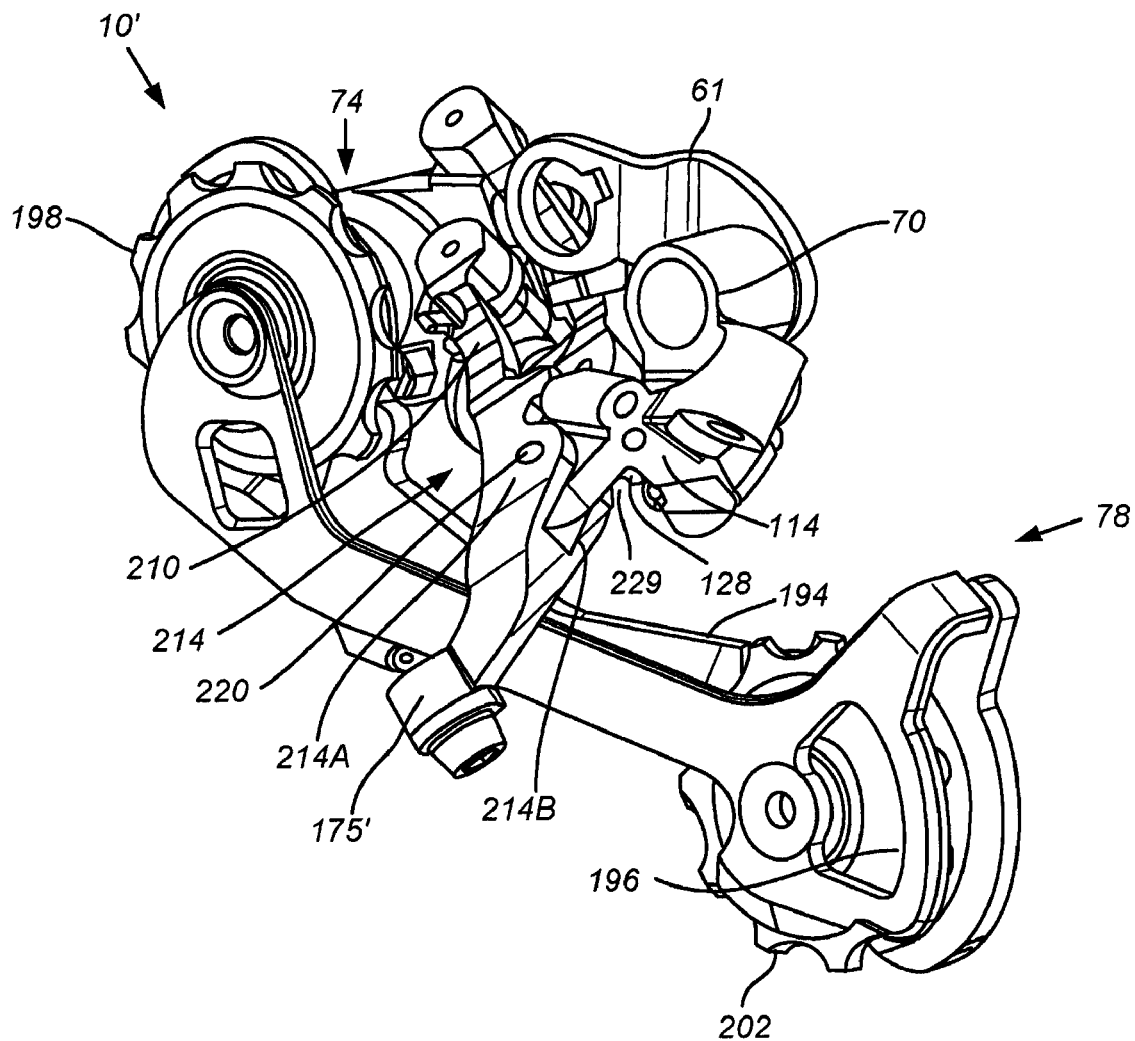
FIG. 15 is a rear oblique view of the derailleur.

FIG. 14 is a rear view of another embodiment of a derailleur 10', and FIG. 15 is an oblique rear view of derailleur 10'. This embodiment uses base member 70' shown in FIG. 10 and a lower link 210 that is a modified version of lower link 166' shown in FIG. 11. More specifically, actuating arm 175 is removed from upper link 162 in the first embodiment, and coupling projection 179A of lower link 166 in the first embodiment is modified to form a coupling projection 214 which, in turn, comprises a pair of spaced apart coupling projections 214A and 214B configured such that laterally inner link coupling projection 122 of base member 70' is sandwiched between coupling projections 214A and 214B. Coupling projections 214A and 214B are pivotably coupled to laterally inner link coupling projection 122 through a pivot shaft 220. An actuating arm 175' extends rearwardly from coupling projection 214. A chain receiving space 229 that accommodates a phantom line L as described above is formed by a laterally outwardly facing surface 227 of coupling projection 214B and the rearwardly and downwardly facing surface 128 of support wall 114. As a result, chain receiving space 229 can receive at least a part of chain 18 when chain guide 78 is disposed in a position somewhere between a laterally outermost rest position and a laterally innermost position (such as the laterally outermost position shown in FIG. 9). A high position adjusting bolt 230 and a low position adjusting bolt 234 may be mounted to coupling projection 214 to perform well known lateral range adjustments for chain guide 78.

While the above is a description of various embodiments of inventive features, further modifications may be employed without departing from the spirit and scope of the present invention. For example, while the various chain receiving spaces accommodated the chain as it extended between the guide pulley and the tension pulley, chain receiving spaces may be formed in the base member to accommodate any operative relation between the base member and the chain when the chain is positioned for normal operation of the bicycle. The size, shape, location or orientation of the various components may be changed as desired. Components that are shown directly connected or contacting each other may have intermediate structures disposed between them. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle rear derailleur comprising:
   a base member;
   a movable member that supports a chain guide including a pulley that rotates around a pulley axis and a tension pulley, wherein the pulley has a pulley plane that bisects the pulley and is perpendicular to the pulley axis; and
   a linking member coupled between the base member and the movable member so that the chain guide moves laterally relative to the base member between a first lateral position and a second lateral position;
   wherein the base member has a frame mounting portion and a linking member coupling portion;
   wherein a linking member is coupled to the linking member coupling portion for rotation around a pivot axis;
   wherein a surface of the linking member coupling portion faces in at least one of a downward direction or a rearward direction;
   wherein a surface of the linking member coupling portion faces laterally;
   wherein a chain receiving space is defined by the intersection of (1) a projection of the laterally facing surface of the linking member coupling portion along the pivot axis with (2) a projection of the downward or rearward facing surface of the linking member coupling portion in the respective downward or rearward directions;
   wherein a phantom line corresponds to a position of a chain that engages the pulley and the tension pulley, wherein the phantom line extends from the pulley to the tension pulley such that one end of the phantom line terminates at the pulley and the other end of the phantom line terminates at the tension pulley;
   wherein the chain receiving space is dimensioned such that, while the chain guide is fixed in a same lateral position, the phantom line can move from outside the chain receiving space to inside the chain receiving space without intersecting the base member; and
   wherein the chain receiving space is dimensioned to receive at least a part of a chain that engages and extends from the pulley along the phantom line when the chain is operatively positioned on the derailleur.

2. The derailleur according to claim 1 wherein the chain receiving space is disposed behind the pulley axis.

3. The derailleur according to claim 1 wherein the phantom line extends rearwardly from the pulley.

4. The derailleur according to claim 1 wherein the phantom line extends from a lower portion of the pulley.

5. The derailleur according to claim 1 wherein a surface of the linking member coupling portion that forms the chain receiving space faces in a downward direction and faces the phantom line in the chain receiving space.

6. The derailleur according to claim 1 wherein a surface of the linking member coupling portion that forms the chain receiving space faces in a rearward direction and faces the phantom line in the chain receiving space.

7. The derailleur according to claim 1 wherein a surface of the linking member coupling portion that forms the chain receiving space faces in a rearward and downward direction and faces the phantom line in the chain receiving space.

8. The derailleur according to claim 1 wherein a surface of the linking member coupling portion that forms the chain receiving space faces laterally inwardly and faces the phantom line in the chain receiving space.

9. The derailleur according to claim 1 wherein a surface of the linking member coupling portion that forms the chain receiving space faces laterally outwardly and faces the phantom line in the chain receiving space.

10. The derailleur according to claim 1 wherein the linking member coupling portion is coupled to the linking member such that the linking member and the linking member coupling portion overlap when viewed in a direction along the pivot axis.

11. The derailleur according to claim 1 wherein the linking member coupling portion is coupled to the linking member such that the linking member and a surface of the linking member coupling portion, that faces in the direction of the pivot axis, overlap when viewed in a direction perpendicular to the pulley plane.

12. The derailleur according to claim 1 wherein the linking member coupling portion is coupled to the linking member such that a surface of the linking member coupling portion, that faces the linking member, faces laterally outwardly.

13. The derailleur according to claim 1 wherein the linking member coupling portion is coupled to the linking member such that a surface of the linking member coupling portion, that faces the linking member, faces laterally inwardly.

14. The derailleur according to claim 1 wherein the base member comprises:
   a first linking member coupling portion coupled to the linking member such that a first surface of the first linking member coupling portion, that faces the linking member, faces laterally inwardly; and
   a second linking member coupling portion coupled to the linking member such that a second surface of the second linking member coupling portion, that faces the linking member, faces laterally outwardly.

15. The derailleur according to claim 14 wherein at least one of the first surface or the second surface faces the other one of the first surface or the second surface.

* * * * *